United States Patent
Yla-Mella et al.

(10) Patent No.: US 6,526,290 B1
(45) Date of Patent: Feb. 25, 2003

(54) AUTOMATIC CONDITIONAL CROSS-CONNECTION

(75) Inventors: Jarmo Yla-Mella, Vantaa (FI); Hannu Esala, Vihti (FI); Hannu Haapajarvi, Vantaa (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/486,110

(22) PCT Filed: Aug. 26, 1998

(86) PCT No.: PCT/FI98/00659

§ 371 (c)(1),
(2), (4) Date: Mar. 13, 2000

(87) PCT Pub. No.: WO99/13618

PCT Pub. Date: Mar. 18, 1999

(30) Foreign Application Priority Data

Aug. 26, 1997 (FI) .................................................. 973506

(51) Int. Cl.$^7$ ............................................... H04Q 7/20
(52) U.S. Cl. ....................................... 455/561; 455/422
(58) Field of Search ............................... 455/422, 450, 455/524, 525, 560, 561, 436; 370/329, 338, 400, 406, 411, 413, 422

(56) References Cited

U.S. PATENT DOCUMENTS

| | | | | |
|---|---|---|---|---|
| 5,418,838 A | * | 5/1995 | Havermans et al. | 455/560 |
| 5,794,149 A | * | 8/1998 | Hoo | 455/436 |
| 5,799,252 A | * | 8/1998 | Nakagoshi et al. | 455/524 |
| 5,930,714 A | * | 7/1999 | Abu-Amara et al. | 455/525 |

FOREIGN PATENT DOCUMENTS

| | | |
|---|---|---|
| EP | 541 410 A1 | 5/1993 |
| EP | 622 919 A1 | 11/1994 |

OTHER PUBLICATIONS

WO94–15298 International Application Published Under The Patent Cooperation Treaty (PCT).
WO94–28644 International Application Published Under The Patent Cooperation Treaty (PCT).
"Finnish Patent Office Search Report for corresponding Finnish Patent Application" Ser. No. 973506 (with interlineated translation).

* cited by examiner

Primary Examiner—Nay Maung
(74) Attorney, Agent, or Firm—Cohen, Pontani, Lieberman & Pavane

(57) ABSTRACT

A cross-connect having a cross-connecting processor, data memory for storing cross-connection data in cyclically recurring elements, and a control memory for storing instructions controlling the cross-connecting. The cross-connect further having a condition monitoring block arranged so as to selectively read cross-connection data from the data memory and indicate the status of a certain cyclically recurring bit or bit combination. In response to the reading of a certain instruction from the control memory the cross-connecting processor reads certain cross-connection data from a certain first source if the condition monitoring block has indicated that a certain cyclically recurring bit or bit combination is in a predetermined first state, and from a certain second if the condition monitoring block has indicated that the cyclically recurring bit or bit combination is in a predetermined second state.

9 Claims, 4 Drawing Sheets

AUTOMATIC CONDITIONAL CROSS-CONNECTION

PRIORITY CLAIM

This is a national stage of PCT application No. PCT/FI98/00659, filed on Aug. 26, 1998. Priority is claimed on that application, and on patent application Ser. No. 973,506 filed in Finland on Aug. 26, 1997.

The invention relates in general to cross-connects which have interfaces to an external communications system, said interfaces being controlled by an internal control circuit in the cross-connect. In particular the invention relates to devices of said nature, in which the operation of the control circuit depends on whether the connections with the external communications system are functioning faultlessly.

FIG. 1a shows a base station network in a cellular radio system, comprising a base station controller 100 (BSC) and a plurality of base transceiver stations 101 (BTS). The base station controller 100 is further connected to a mobile switching center, which is not shown. To enable transmission of data between them, the base station controller 100 and base transceiver stations 101 are interlinked through a plurality of connections which constitute a so-called transmission system in the base station network. The standards for a cellular radio system such as the Global System for Mobile Telecommunications (GSM), for example, usually do not specify the transmission method to be used in the base station network, except for defining the functions that the transmission method has to be capable to realize. In GSM, the interface between two base transceiver stations or a base transceiver station and the base station controller, as defined in the standards, is called the Abis interface. The transmission method may comprise e.g. a 2-Mbit/s or 1.5-Mbit/s PCM connection (Pulse Coded Modulation; ITU-T G.703 and G.704), SDH connection (Synchronous Digital Hierarchy; ITU-T G.774.03), ATM connection (Asynchronous Transfer Mode; ETS 300 371), ISDN connection (Integrated Services Digital Network), or a HDSL connection (High Density Digital Subscriber Line). The physical connection may comprise an ordinary copper wire, optical cable or a microwave radio link.

In the base transceiver stations and base station controller of the system depicted in FIG. 1a connection to the transmission system is realized through a cross-connect 102. A cross-connect 102 in a base transceiver station may comprise one or more transmission units (TRU). Cross-connecting means that the incoming data, which are arranged in frames, can be connected to the outgoing direction in the cross-connecting device such that the location of the data bits in the frames can be altered. The base transceiver station cross-connect "drops" certain bits and time slots in the transmission system frame to the base transceiver station, i.e. directs data concerning that particular base transceiver station, which arrive in certain time slots, to the base transceiver station and, on the other hand, associates the data leaving the base transceiver station in the direction of the base station controller with certain time slots allocated to that base transceiver station. The cross-connect may also perform summing, multiplication or other operations on the incoming data before the data are connected to the outgoing direction. When the cross-connect is placed either in the same equipment rack with the base transceiver station or in its immediate vicinity, the base transceiver station constitutes a compact unit and the base station network can be easily modified and expanded.

The transmission capacity allocated to one base transceiver station depends on how many TRX (Transmit/Receive) units 103 it contains. The TRXs constitute a radio interface to terminal equipment 104, and the number of TRX units determines how many simultaneous speech or data connections the base transceiver station can handle. Different parts of the base station network may also require different amounts of transmission capacity depending on the base station network topology. In a tree-like base station network the highest capacity is required of connections near to the base station controller.

At its simplest a transmission system comprises a so-called point-to-point connection where a given GSM base transceiver station communicates directly with the base station controller and through the latter with a switching center. However, in the case of a 2-Mbit/s PCM, for example, the traffic capacity required by a base transceiver station having one TRX is quite small compared to the whole transmission band. Typically, two and a half time slots in a PCM frame (6 to 8 voice channels and signalling), or 160 kbit/s, are reserved for one TRX. Therefore, a point-to-point connection often wastes capacity and becomes expensive. On the other hand, the use of existing ISDN connections for point-to-point connections may be an alluring idea. Network back-up can be realized using redundant point-to-point connections.

The transmission band can be utilized more efficiently by chaining base transceiver stations (so-called multidrop chain structure). In the chain, several base transceiver stations share, on a time division basis, the same transmission medium, thus better utilizing the connection capacity. Thus the integrated cross-connecting function in the base transceiver station really becomes useful as the time slot arrangements can be made within the base transceiver station.

Loop networks are used for network duplication. Base transceiver stations are looped together so that there exists at all times a transmission connection in both directions of the loop from each base transceiver station to the BSC. Normally, one of the connections is active. Network monitoring is realized using status bits, or so-called called pilot bits, which each base transceiver station sends in both transmission directions in the loop. A change in the state of a pilot bit indicates a network fault, at which point cross-connects in base transceiver stations switch over to the back-up connection. Network synchronization data are also sent using status bits of their own. A switch-over as quick as possible enables network operation without disconnected calls even in fault situations. A GSM call can tolerate a 500-ms break in the transmission connection without disconnecting the call proper.

FIG. 1b shows a prior-art cross-connect in a GSM base transceiver station. It has two separate transmission units 110 and 111. Both transmission units have an "out-bound" Abis interface according to the GSM standards, i.e. an interface to either the base station controller or another base transceiver station (not shown). In addition, both transmission units have an administrative connection to the base station controller. One of the transmission units is also connected to the internal data bus in the base transceiver station which is used in sending the downlink data associated with the voice and signalling connections handled by the base transceiver station to the TRX units (not shown) of the base transceiver station, and, correspondingly, the uplink data from the TRX units to the base station controller. In the prior-art implementation the transmission units 110 and 111 in the cross-connect are wholly separate and they both have internal cross-connecting buses of their own. The transmission units are interconnected through the Abis interface as shown in FIG. 1b.

In future cellular radio systems the average cell size will be smaller and, hence, the number of cells greater than today so that transmission systems shall be capable of handling more base transceiver stations, and network topologies and cross-connections will be more complex than now. The operator providing the transmission medium will not necessarily be the same as the operator running the cellular radio system, so the latter must be able to realize transmission between base transceiver stations and base station controllers as advantageously and efficiently as possible, using the various transmission possibilities available.

SUMMARY OF THE INVENTION

An object of this invention is to provide a base transceiver station cross-connect which responds to transmission system faults quickly, effectively and reliably.

The objects of the invention are achieved by realizing in the cross-connect hardware-based monitoring of transmission system status bits and cross-connect changes on the basis of changes observed in the state of the status bits.

The cross-connect according to the invention comprises a cross-connecting processor, data memory for storing cross-connection data in cyclically recurring elements, and a control memory for storing instructions controlling the cross-connecting. It is characterized in that it comprises a condition monitoring block arranged so as to selectively read cross-connection data from said data memory and indicate a change in the status of a certain cyclically recurring bit or bit combination, and said cross-connecting processor is arranged so as to perform, in response to the reading of a certain instruction from said control memory, a certain first switching operation to certain cross-connection data when said condition monitoring block has indicated that said cyclically recurring bit or bit combination is in a predetermined first state, and a certain second switching operation to said cross-connection data when said condition monitoring block has indicated that said cyclically recurring bit or bit combination is in a predetermined second state.

The invention is also directed to a method for realizing conditional cross-connection. The method according to the invention is characterized in that it comprises steps in which a) a certain portion of the cross-connection data stored in the data memory is read and its status is indicated, b) a conditional cross-connecting instruction, which contains information on at least two cross-connection data sources, is read from the control memory, and c) if a predetermined first status was indicated in step a), a certain first switching operation is performed to certain cross-connection data the source of which is specified in the cross-connecting instruction, and d) if a predetermined second status was indicated in step a), a certain second switching operation is performed to certain cross-connection data the source of which is specified in the cross-connecting instruction.

In the inventional structural solution the cross-connection and the functions required by the transmission connections are implemented modularly by decentralizing them into several parts which in this patent application are called transmission units. Decentralization is to be understood such that a single transmission unit can establish all transmission connections of a base transceiver station but units can be added according to capacity requirements so that they function as a whole. The cross-connection is shared by the transmission units through a parallel bus in the so-called motherboard, which bus interconnects the transmission units and is advantageously duplicated for reliability. From the point of view of base station control the transmission units constitute one controllable whole. Each transmission unit realizes a certain type of standard transmission interface.

As the amount of GSM traffic increases there also emerges a need to have different transmission interfaces in one and the same base transceiver station. Therefore, the new base station solution can use transmission units of many different types. Within a transmission unit, a given first part realizes the transmission interface and converts the received data, which are to be cross-connected, from the format used in the transmission system to the internal format used in the cross-connect. The data are written in that format to the cross-connecting bus interconnecting the transmission units. The other parts of the transmission unit realize advantageously at least cross-connection, unit control, synchronization with other transmission units and interfaces to the base station motherboard. A transmission unit may comprise one or more printed circuit boards. Hereinafter, the term "special part" refers to parts realizing a transmission interface and the term "common part" refers to the cross-connecting and bus interface block. In addition to the functions mentioned above, a transmission unit may include other functional blocks, too.

The special part in the transmission unit adapts the cross-connect in the base transceiver station to the base station network's transmission system, which may be a PCM, HDSL or ISDN system, for example. Advantageously the special part may also comprise adapter circuits for different physical transmission media such as copper wire, optical cable or radio link.

In the common part, all data traveling through the cross-connecting bus are stored in the data memory. One of the blocks in the cross-connecting circuit in the common part is the condition monitoring block which reads, in accordance with pre-set conditions, certain pilot bits from the data stored in the data memory. A change in the state of a pilot bit implies a fault in the transmission system, whereby the state of the status register in the condition monitoring block changes. The instructions controlling the operation of the cross-connecting processor take into account the situations in which the operation depends on the status register bits. As the cross-connecting processor, controlled by an instruction, detects a change in the status register, it carries out the cross-connecting action defined by the instruction in a different manner than if no changes had been detected in the status register.

BRIEF DESCRIPTION OF THE DRAWINGS

The invention will now be described in more detail with reference to the preferred embodiments presented by way of example and to the accompanying drawings wherein.

DETAILED DESCRIPTION OF THE PRESENTLY PREFERRED EMBODIMENTS

Figure 1A:
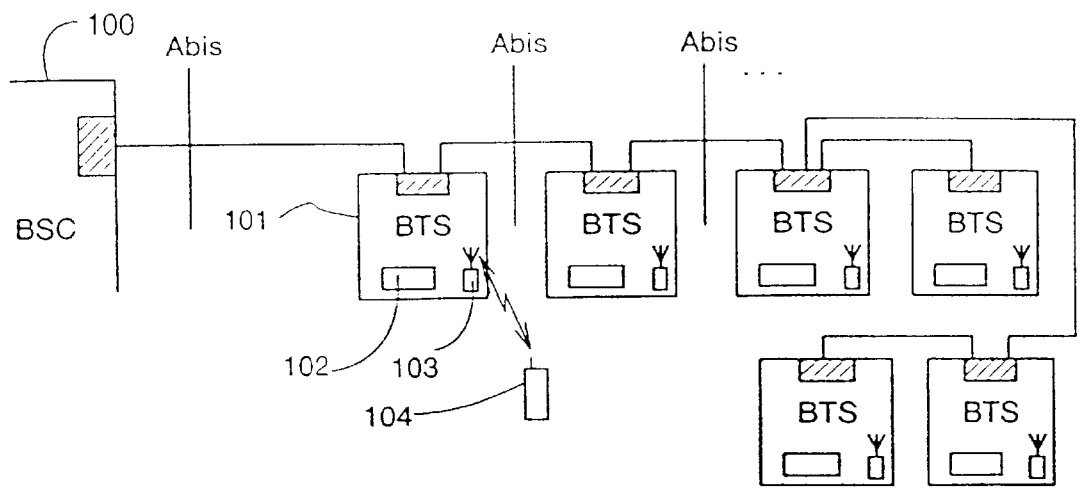
FIG. 1a shows a known base station network.
Figure 1B:
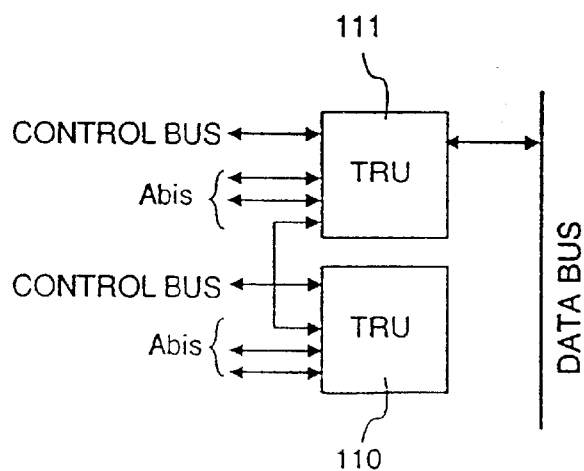
FIG. 1b shows a known cross-connect in a base transceiver station.
Figure 2:
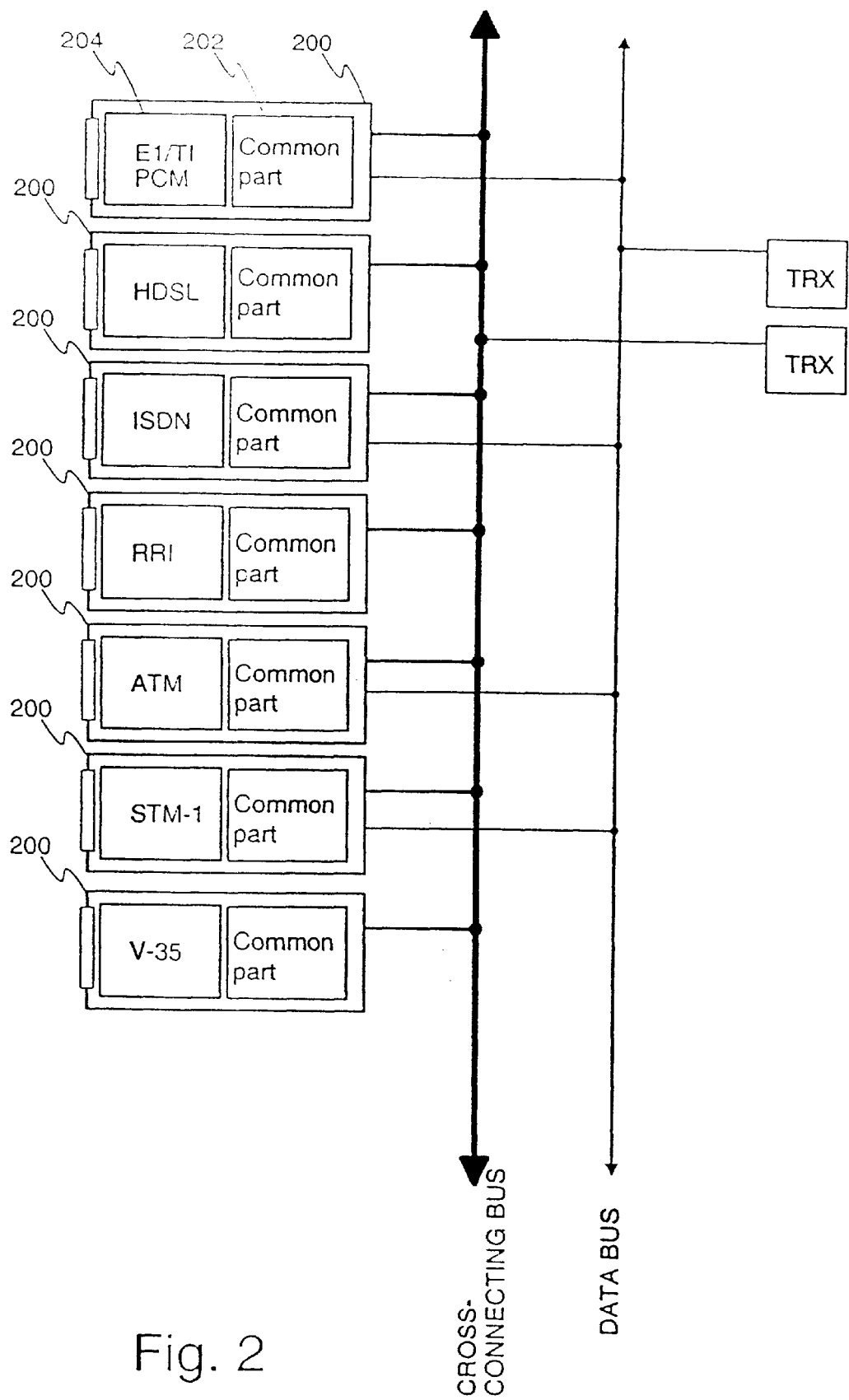
FIG. 2 shows a cross-connect in which the invention can be applied.

FIG. 2 shows an example of the new structure for the cross-connect in a base transceiver station. The cross-connect comprises at least one transmission unit 200. It may also have more transmission units depending on the desired quality and quantity of the transmission connections. Each transmission unit 200 comprises a common part 202 and special part 204. In a preferred embodiment each transmission unit is realized on a circuit board containing the necessary physical interfaces and functional blocks required by the common part 202 and special part 204. The transmission units are electrically coupled to the internal doubled cross-connecting bus of the base transceiver station. The transmission units may also be coupled to the data bus used by the transmitter/receiver units, or TRXs, of the base transceiver station. In a typical embodiment, where the TRX units of the base transceiver station are connected to the data bus, at least one transmission unit has to be coupled to the data bus to enable data communications between the TRX units and transmission connections outside the base transceiver station via the transmission units. In other embodiments of the invention the TRX units may also be coupled to the cross-connecting bus.

In addition to the cross-connecting bus and data bus shown in FIG. 2 the base transceiver station may also include other buses for controlling and synchronizing the operation of the transmission units. In such an embodiment the transmission units are coupled to those buses, too.

The special part 204 in each transmission unit 200 has at least one bi-directional external transmission connection 206 which may be e.g. a PCM, SDH, ATM, ISDN, HDSL or some other connection. The special part, which is of RRI (Radio Relay Interface) type, is advantageously directly connected to the outside unit of the microwave radio in the base transceiver station. In one cross-connect the external transmission connections in the special parts of the transmission units may all be identical or they may be different. In addition, a transmission unit may have interfaces for two or more types of transmission connections. Data traffic between the special part 204 and common part 202 is preferably substantially similar in all transmission units independent of the type of the external transmission connection. An advantageous solution is to provide N standard-capacity (say, 2.048 Mbit/s) connections between the special part and common part, where N is chosen such that the transmission capacity between the special part and common part at least equals the combined capacities of the transmission connections coupled to the special part.

Figure 3:
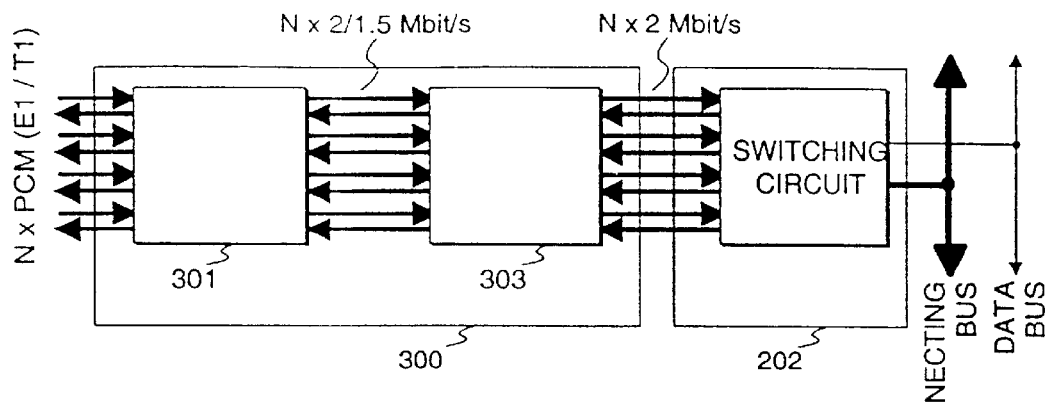
FIG. 3 shows in more detail part of FIG. 2.

FIG. 3 shows in more detail a special part 300 of a transmission unit in a cross-connect according to the invention, which special part is intended for the transmission and reception of a PCM signal. It has an N-channel line interface circuit 301 which, when receiving, is adapted to the received signal level and extracts and regenerates timing information from the data. Depending on the application, the line impedance may be 75 ohms, 120 ohms (E1) or 100 ohms (T1). When transmitting, the line interface circuit 301 adapts the data to the transmission medium, which is a coaxial cable or twisted-wire pair. The transmission line is logically terminated by an N-channel framer circuit 303. When receiving, it decodes the line coding (e.g. high density bipolar 3, HDB3; alternate mark inversion, AMI; or binary 8 zero substitution, B8ZS) and becomes locked to the frame phase by means of frame alignment words in the data stream. In addition, the framer circuit 303 includes other functions e.g. for processing overhead data; decoding the channel signalling, handling of T1 HDLC messages, processing various alarm information, etc. Finally, the special part delivers the data stream to the common part in a form in which the clock signal is separate from the data and the start of a frame is indicated using a signal of its own. In the outgoing direction the steps mentioned above are carried out in the reverse order.

Regardless of whether the transmission interface capacity is 2.048 Mbit/s (E1) or 1.554 Mbit/s (T1), the framer circuit 303 always provides an N×2.048 Mbit/s interface to the common part. This is achieved by internal data buffering inside the framer circuit 303 and by placing the data in the E1 frame structure in connections between the framer circuit 303 and common part 202, so that if the lower-capacity T1 frame structure is used in the transmission, the "extra" time slots in the E1 frame structure are filled with pseudo-data. The same principle holds with other applications of the special part; the interface to the common part is always N×2.048 Mbit/s.

Figure 4:
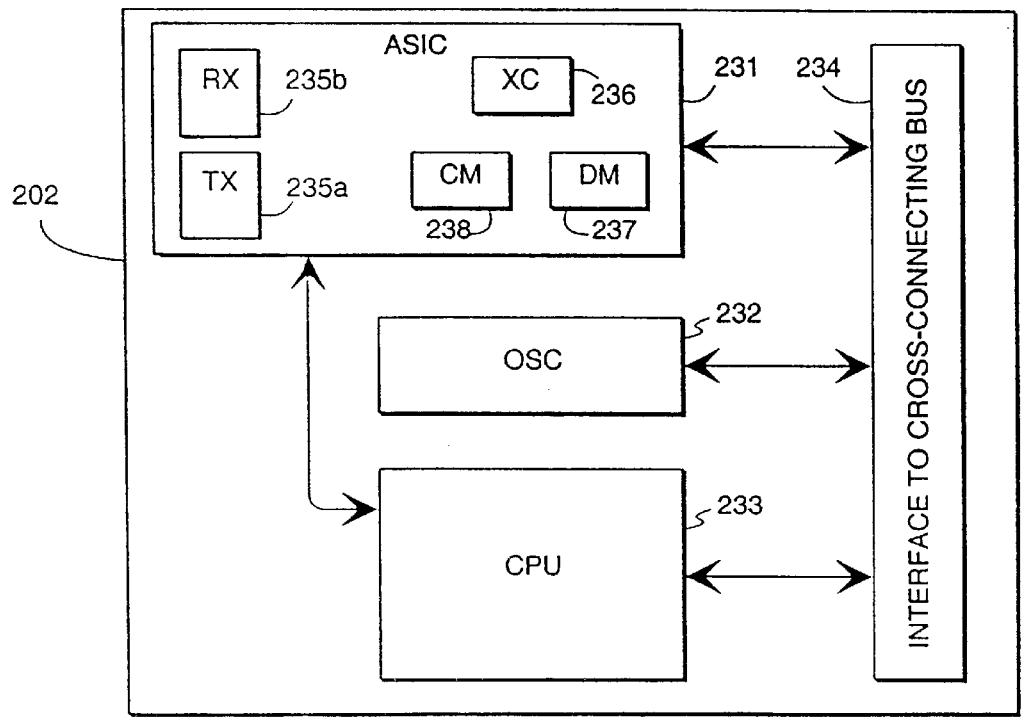
FIG. 4 shows in more detail another part of FIG. 2.

FIG. 4 shows in simplified form the basic electrical structure of a transmission unit's common part 202. The common part comprises a cross-connecting circuit 231, which usually is an application specific integrated circuit (ASIC) and which hereinafter will be called a switching circuit. In addition, the common part comprises an oscillator 232, microprocessor 233 and a cross-connecting bus interface 234. Transmitter and receiver blocks 235a and 235b for communications with the special part are located in the switching circuit 231 which further comprises, among other things, a cross-connecting processor 236, data memory (DM) 237 and control memory (CM) 238. The data memory 237 serves as an intermediate data store where the outgoing data, i.e. data flowing from the cross-connecting bus to transmitter blocks via the switching circuit, are temporarily stored for rearrangement. The microprocessor 233 controls the operation of the entire common part.

Through the cross-connecting bus interface 234 the common part is connected to the cross-connect's cross-connecting bus whose data structure conforms to a certain bus protocol. Data on the cross-connecting bus are arranged in frames having a certain regular form. Each frame on the cross-connecting bus is stored in its turn to the data memory DM of the cross-connecting circuit 231. A cross-connecting processor XC reads data from the data memory DM e.g. one byte at a time and writes those data to transmitter blocks 235a which lead to the special part of the transmission unit. A term called granularity defines the smallest amount of data that can be independently managed in a write operation. If the granularity is one bit, it means that each bit read from the data memory DM and written to transmitter blocks 235a can be controlled independent of other bits. Instruction words read from the control memory CM determine the order in which the data read from the data memory DM are written to transmitter blocks 235a.

A GSM call according to the prior art requires a 16-kbit/s capacity in the transmission system, corresponding to two bits in a PCM transmission system frame (according to G.703 and G.704 standards, PCM frames are repeated 8000 times a second in the transmission system so that one bit per frame corresponds to a capacity of 8 kbit/s). However, in the cross-connect according to the invention it is advantageous to prepare for the so-called half-rate GSM connections, each of which represents a transmission capacity of just 8 kbit/s. Since cross-connects have to be able to handle these connections independent of each other and, furthermore, since it is advantageous to prepare for the channel associated signalling (CAS) according to standards G.703 and G.704 in cross-connects. the granularity has to be one bit.

To provide background for the invention it will be next described briefly various switching types in a cross-connect.

The B type is the simplest switching type: for each outbound bit it is possible to indicate the position from which the bit is to be connected. If granularity is one bit and the transmission connection complies with G.703/G.704, the cross-connecting level is 8 kbit/s. If the aforementioned channel associated signalling (CAS) is used, the switching circuit may cross-connect it. too, by specifying a 64-kbit/s connection in the time slot corresponding to the CAS channel. Although the switching circuit according to the invention will probably be used primarily in GSM systems in which CAS is not used, it is advantageous to support the cross-connection of CAS in the switching circuit in order to prepare for a situation in which the GSM base station system is part of a fixed network and the fixed network channels with CAS signalling must be connected through.

The Y type can be used for specifying conditional switching. Granularity may be 32 kbit/s or 64 kbit/s, depending on whether the CAS, too, is to be switched. Conditional switching means that a certain outbound information element (bit, portion of byte or byte) can be connected from two alternative sources, i.e. two alternative locations in the incoming data. Y-type switching is used e.g. at a loop network base station which in principle receives the same information from two different directions via the transmission system. In that case the cross-connect in the base station chooses one of the received data to be transmitted further (or to be sent to the TRX unit in the base station). The data source is changed when a certain condition is met. The existence and implementation of conditional switching as such are known but the present invention pertains to how the cross-connect decides that the conditional switching condition is met and the connection should be changed.

C-type switching can be used for carrying out digital summing of channels. Depending on the number of sources to be summed and whether or not CAS channels are to be summed the switching level may be 16 kbit/s, 32 kbit/s or 64 kbit/s. Determining the sources to be summed and instructions controlling the summing are described in more detail in patent application "Instruction architecture of cross-connecting processor" filed at the same time with this application by the same applicant.

Figure 5:
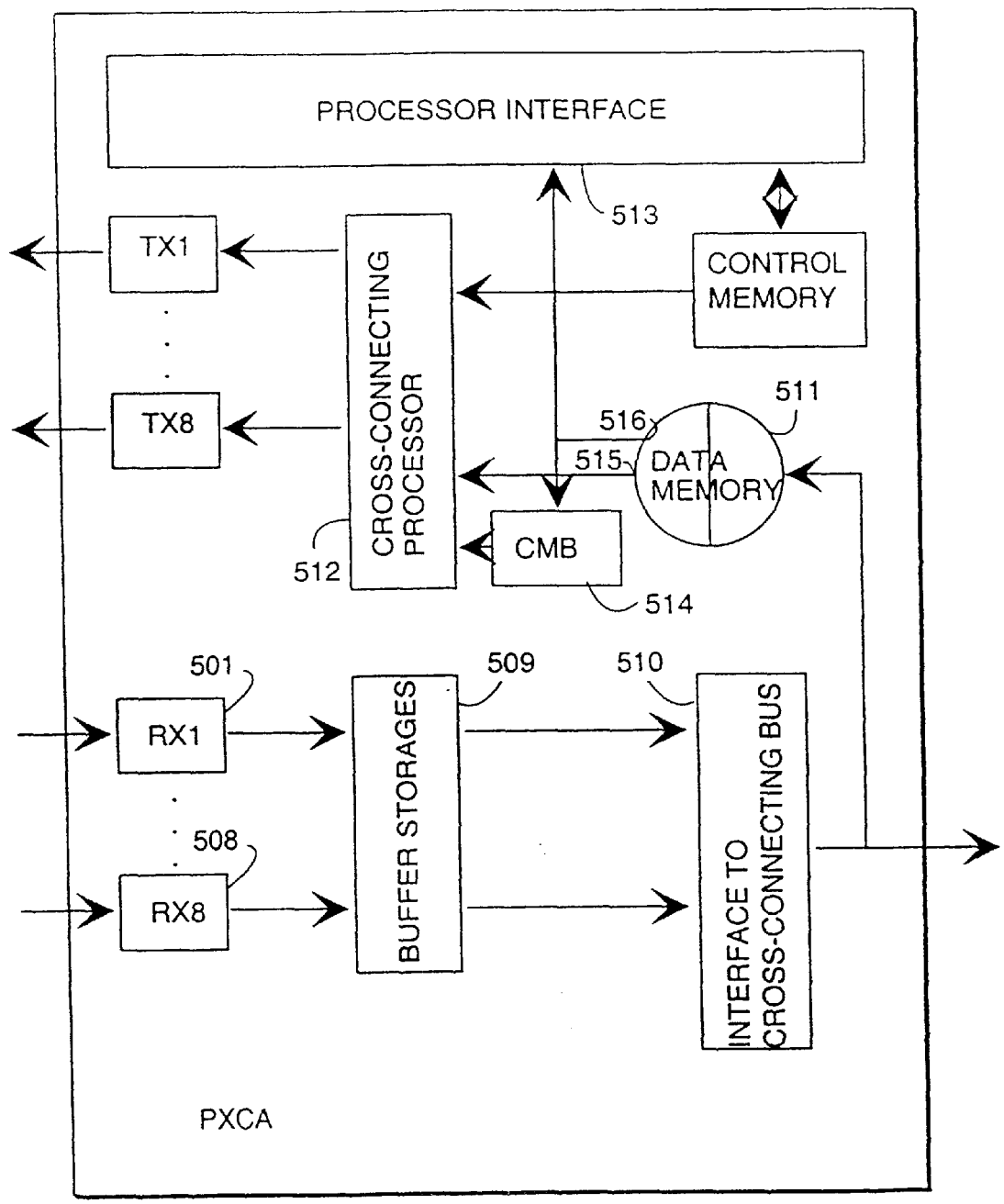
FIG. 5 shows in more detail part of FIG. 4.

FIG. 5 shows a simplified diagram of a switching circuit in a cross-connect according to the invention. For simplicity, only some of the blocks in the switching circuit are shown. Receiver blocks 501–508 receive data from the special part (not shown) of a transmission unit and transmit the data through a kind of buffer storage arrangement 509 to a cross-connecting bus interface 510. The latter writes the received data to the cross-connecting bus, to a location in the frame structure of the cross-connecting bus that is allocated to the transmission unit in question. All data read from the cross-connecting bus are stored in frames in the data memory 511 from where they can be read by the cross-connecting processor 512, switching circuit's microprocessor interface 513 and the condition monitoring block 514. Reading is carried out through read ports of which there are two in the data memory 511. One read port 515 is used solely by the cross-connecting processor 512 because in this exemplary case it has to read data from the data memory at every clock edge of the switching circuit's 16.384-MHz clock frequency signal. The use of the other read port 516 is time shared between the microprocessor interface 513 and condition monitoring block 514 in such a manner that the condition monitoring block has the right of precedence to the read port 516.

Between the microprocessor interface 513 and condition monitoring block 514 there is a read and write connection through which a microprocessor, which is coupled to the microprocessor interface 513 and controls the operation of the transmission unit in question, can read the contents of memory locations in the condition monitoring block 514 and write to those locations. In addition, there is a read connection between the condition monitoring block 514 and cross-connecting processor 512 through which the cross-connecting processor 512 can read the contents of memory locations in the condition monitoring block 514. The condition monitoring block can store a certain number of conditions in it so that data on the cross-connecting bus can be monitored in regard to those conditions. Lest the condition monitoring block become unreasonably big, the number of conditions should be limited. A suitable upper limit is 128 conditions.

A condition comprises a bit address, definition register and a condition status register. In addition, there has to be a certain counter for each condition. The bit address identifies the bit in the cross-connecting bus frame structure that is to be monitored. The length of the bit address is thus determined by the number of bits in the cross-connecting bus frame structure; in the development work that led to the invention it was used a cross-connecting bus frame that comprised 13,824 bits (54 blocks with 32 time slots each and 8 bits in each time slot), in which case the bit address length has to be 14 bits ($2^{14}$=16,384). The definition register uses certain code values to specify special features related to the processing of each condition. A definition register value may e.g. specify whether the condition in question is updated by the switching circuit or a microprocessor coupled to the microprocessor interface, where "updating" means that the switching circuit or microprocessor monitors the bit indicated by the condition and, when necessary, responds to a change detected in the status of the bit. A certain code value in the definition register may also indicate whether the bit monitored is normal data, Sa bit (a certain national usage bit in the zero time slot in the G.703/G.704 E1 frame) or a CAS signalling bit (a certain channel associated signalling bit in the G.703/G.704 E1 frame), and what is the degree of filtering directed to the bit in question. The size of the definition register may be four bits per condition, for example.

In a preferred embodiment the size of the condition status register of each condition is just one bit, and its value indicates the bit's "established status" detected in the position specified by the bit address. In this context, "established" means that the value of the condition status register is not changed until a value other than that in the condition status register has been detected N times in succession. Number N indicates the degree of filtering. A condition-specific counter is needed to count how many deviating bit values have been detected in succession before the value in the condition status register is changed.

By means of the condition monitoring block 514 the switching circuit can independently monitor the status of data bits coming in through any cross-connect interface in the base station. Monitoring takes place only after the cross-connecting bus, which makes possible the monitoring of data coming in through other transmission units in the cross-connect as well.

By means of the bit address any condition can be directed to any time slot and bit in any cross-connecting bus frame block. In addition, it is possible to set monitoring for the Sa bits and CAS bits in odd-numbered frames. Each bit can be monitored using either three- or six-stage filtering, i.e. the status information is not changed until the changed bit status has been detected three or six times in succession.

There are two main uses for bit monitoring in a transmission unit. First, pilot bit status data are used as Y-type switching conditions. In the duplication of a loop base station network the cross-connect that carries out Y-type switching is set so as to monitor pilot bits in both transmission directions. Normally, when the transmission connections are functioning faultlessly, the value of the pilot bit under observation arrives in the monitoring cross-connect identical from both transmission directions so that the cross-connect selects for switching the data coming from either one of the transmission directions. The selection is conservative, i.e. the cross-connect prefers to select the transmission direction that was already in use. If the status of a pilot bit coming from the chosen transmission direction changes but the value of the same bit coming from the alternative transmission direction remains unchanged, the cross-connect starts to connect data coming from the "standby" transmission direction. Since the monitoring of the status of pilot bits is an integral part of the operation of the switching circuit, the switch-over can be carried out very quickly as the pilot bit status information changes. It should be noted that, because of filtering, a change in the value of a pilot bit is not the same thing as a change in the corresponding status information; three- or six-stage filtering is used lest single bit errors on the transmission path make the connection oscillate.

Second, bit monitoring realized at the switching circuit's hardware level can be utilized in the fast synchronization source switch-over based on the monitoring of synchronization bits in a loop or chain network. So-called master clock bit (MCB) and loop clock bit (LCB) determine the loop input interface, to which synchronization is realized, and whether or not to operate as the master clock of the system. In practice, the switching circuit is set so as to monitor synchronization bits and it sends an interrupt to the microprocessor if the status information of the synchronization bits is changed. After that, the microprocessor reads the status information from the switching circuit and possibly carries out synchronization source switch-over. Six-stage filtering may also be used in that case. The bit monitoring function in the switching circuit can also be used in situations where it is desirable to monitor fixed status information in the data bits.

Monitoring of pilot bits and MCB/LCB bits in cross-connects has conventionally been realized at software level using the polling principle and software filtering. This has considerably added to the microprocessor load in cases which have many Y-type connections associated with different conditions. Thus, bit monitoring realized by the switching circuit considerably reduces the load of the microprocessor. A second advantage is that in Y-type connections the source switch-over is performed with a very short delay, even in less than 400 µs. Likewise, the MCB/LCB status information is detected quickly by the processor because of the interrupt request generated for it.

If the maximum amount of conditions is 128 and the length of the bit address is 14 bits, the size of the condition source RAM, i.e. the RAM that contains the bit addresses, is 128×14=1792 bits. The bit definitions are advantageously realized in RAM because it would take up to 50,000 logic gates to realize a storage of this size by registers.

Conditions are read cyclically in phase with the cross-connecting bus frame so that all 128 monitoring occurrences are spread evenly across the cross-connecting bus frame time (say, 125 µs). A monitoring cycle advantageously utilizes the block and time slot counters of the cross-connecting bus. For each condition, a bit address and the contents of the definition register are first read. If the condition is an update by the microprocessor, defined in the definition register, the condition monitoring block will do nothing more. Update by microprocessor is used for Y-type connections that comply with a condition transparent to the switching circuit. If the bit monitored is normal data or an Sa bit, the contents of the condition source RAM are read each time, and in the case of CAS, every 16th time. CAS visible to the switching circuit is always fixed for the duration of 16 frames. After that, the data RAM is read at a memory location indicated by the condition source RAM. If the definition was Sa bit, bit 2 is interpreted to find out whether the frame is an even-numbered one, in which case it is rejected.

When the bit monitored has been read from the data RAM, its status is compared with the value in the condition status register. If the values match, no further measures are taken. If the values differ, the value of the so-called condition filtering RAM is read for the condition in question. This value is increased by one unless it already has the maximum value, in which case it becomes one. The maximum value depends on whether three- or six-stage filtering is used. If the value of the filtering RAM is 2 (or 5 in the case of six-stage filtering), it is further increased by one, but also the value of the condition status register is changed. Thus, the value of the condition status register associated with the condition is not changed immediately but only after the status of the bit monitored will have been changed for three or six successive cycles. So, to realize six-stage filtering, a 3×128-bit RAM is needed as condition filtering memory.

Above it was described how the condition status register value depends on read operations carried out by the condition monitoring block. The conditional cross-connection proper takes place when the cross-connecting processor reads from the control memory an instruction which is of the so-called Y type, i.e. defines for a certain outbound byte or portion of byte at least two alternative sources (i.e. locations of byte or portion of byte in the frame structure read from the cross-connecting bus) and at least one condition associated with a condition status register whose value determines which source is connected to the outbound byte or portion of byte. The structure of the Y-type instruction is described in more detail in patent application "Instruction architecture of cross-connecting processor" filed at the same time with this application by the same applicant. Its essential parts include the type identifier, which tells that this is a Y-type instruction, location identifiers, which indicate the position of the alternative data sources in the frame stored in the data memory, and condition identifiers, which indicate the condition(s) that affect the Y-type connection in question. The instruction may also contain fixed data, or a bit pattern written into the outbound byte or portion of byte instead of the bit pattern read from the data memory upon a certain value of the condition(s). The instruction may also specify that a certain value of the condition(s) causes a logical operation between the bit pattern read from the data memory and the fixed data included in the instruction. The address in the control memory of the instruction determines the transmitter interface and time slot that are affected by the conditional cross-connection in question.

In accordance with the inventional idea disclosed in this patent application the condition monitoring block may also monitor, instead of a single bit, a multibit combination such as portion of a byte, byte or even several bytes. If, however, one wants to monitor all bits in a bit combination simultaneously, the condition status register has to be bigger than described above, since the condition status register must have a status bit for each bit monitored. This adds to the complexity of the switching circuit needed. An alternative way of monitoring several bits is to perform a simple logic operation on the bits monitored, the result of said operation being one bit or, in the case of a great number of bits monitored, a considerably smaller number of bits. The result of the logic operation is compared with a condition status register value of equal bit size in the same way that one monitored bit was above compared with the one-bit value of the condition status register.

Embodiments of the invention may of course vary within the scope of the claims set forth below. For example, the invention does not require that cross-connection data be stored in the data memory in frames. To realize condition monitoring it suffices that data are stored with cyclic recurrence, i.e. each bit or bit combination monitored occurs in the data memory with such regularity that the condition monitoring block can direct its read operation to them always when they occur or at least once in a while. Naturally, the more often the condition monitoring block reads a bit or bit combination, the more quickly a change in the status of the bit or bit combination is detected.

What is claimed is:

1. A cross-connect comprising:

a cross-connecting processor;

data memory for storing cross-connection data in cyclically recurring elements;

a control memory for storing instructions controlling the cross-connection; and a condition monitoring block arranged so as to selectively read cross-connection data from said data memory and indicate the status of a certain cyclically recurring bit or bit combination, said cross-connecting processor being arranged so as to preform, in response to the reading of a certain instruction from said control memory, a certain first switching operation to certain cross-connection data when said condition monitoring block has indicated that said cyclically recurring bit or bit combination is in a predetermined first state, and a certain second switching operation to said cross-connection data when said condition monitoring block has indicated that said cyclically recurring bit or bit combination is in a predetermined second state.

2. The cross-connect of claim 1, wherein said data memory is arranged so as to store cross-connection data in frames, and said condition monitoring block is arranged so as to read a certain bit in every frame stored in the data memory.

3. The cross-connect of claim 2, wherein said condition monitoring block comprises a condition status register for storing the value of a certain bit in a frame read from the data memory, and said condition monitoring block is arranged so as to indicate a change in the status of the bit in question in response to having detected that the bit value in N successive frames stored in the data memory differs from the value stored in said condition status register, where N is a positive integer, so that said condition monitoring block is also arranged so as to store the new value of the bit in question in the condition status register only after it has remained unchanged for N successive frames.

4. The cross-connect of claim 1, wherein said first and second switching operations are defined in relation to a first data source and a second data source which are locations in the cyclically recurring element stored in said data memory and said cross-connecting processor is arranged so as to read the addresses of said first source and said second source from said instruction.

5. The cross-connect of claim 1, further comprising a processor interface to provide a communications connection with a microprocessor so that the selective read operations performed by said condition monitoring block can be controlled by a microprocessor coupled to said processor interface.

6. A method for realizing conditional cross-connection in a cross-connect which comprises a cross-connecting processor, data memory for storing cross-connection data in cyclically recurring elements, and a control memory for storing instructions controlling the cross-connecting comprising:

a) a certain portion of the cross-connection data stored in the data memory is read and a status of the data is indicated, b) a conditional cross-connecting instruction, which contains information on at least two cross-connection data sources, is read from the control memory, and c) if a predetermined first status was indicated in step a), a certain first switching operation is performed to certain cross-connection data the source of which is specified in the cross-connecting instruction, and d) if a predetermined second status was indicated in step a), a certain second switching operation is performed to certain cross-connection data the source of which is specified in the cross-connecting instruction.

7. The method of claim 6, wherein step a) is repeated N times where N is a positive integer, keeping the value of the portion of cross-connection data stored earlier in the data memory, unchanged, and status change is indicated in step a) only if the value of the portion of the data read differs in all N readings from the value of the portion of the cross-connection data stored earlier in the data memory.

8. A base station network in a cellular radio system, comprising:

a: base station controller;

at least one base station;

a transmission system linking together the base station controller and the at least one base station; and a cross-connect in at least one base station, the cross-connect comprising:

a cross-connecting processor;

data memory for storing cross-connection data in cyclically recurring elements;

a control memory for storing instructions controlling the cross-connection; and a condition monitoring block arranged so as to selectively read cross-connection data from said data memory and indicate the status of a certain cyclically recurring bit or bit combination, said cross-connecting processor being arranged so as to perform, in response to the reading of a certain instruction from said control memory, a certain first switching operation to certain cross-connection data when said condition monitoring block has indicated that said cyclically recurring bit or bit combination is in a predetermined first state, and a certain second switching operation to said cross-connection data when said condition monitoring block has indicated that said cyclically recurring bit or bit combination is in a predetermined second state.

9. The cellular base station network of claim 8, wherein the cellular base station network has a loop-like topology so that said base station has two transmission connections and the cross-connect is arranged so as to select one of said two transmission connections as the source of cross-connection data using conditional cross-connecting.

* * * * *